(12) United States Patent
Higuchi et al.

(10) Patent No.: US 9,185,687 B2
(45) Date of Patent: *Nov. 10, 2015

(54) TRANSMISSION AND RECEPTION BANDWIDTH SETTING METHOD, MOBILE TERMINAL AND BASE STATION IN RADIO COMMUNICATION SYSTEM THAT DEFINES A PLURALITY OF SIGNAL BANDWIDTHS

(71) Applicant: NTT DOCOMO, INC., Tokyo (JP)

(72) Inventors: Kenichi Higuchi, Yokohama (JP); Hiroyuki Atarashi, Yokohama (JP); Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,123

(22) Filed: Oct. 31, 2013

(65) Prior Publication Data

US 2014/0056264 A1 Feb. 27, 2014

Related U.S. Application Data

(63) Continuation of application No. 12/092,229, filed as application No. PCT/JP2006/322209 on Oct. 31, 2006, now Pat. No. 8,626,216.

(30) Foreign Application Priority Data

Oct. 31, 2005 (JP) ................................ 2005-317572

(51) Int. Cl.
*H04B 7/00* (2006.01)
*H04B 15/00* (2006.01)
(Continued)

(52) U.S. Cl.
CPC ............... *H04W 72/04* (2013.01); *H04B 1/707* (2013.01); *H04L 5/003* (2013.01); *H04L 5/0058* (2013.01); *H04W 74/0816* (2013.01)

(58) Field of Classification Search
USPC ................................ 455/67.13, 63.1, 226.1
See application file for complete search history.

(56) References Cited

U.S. PATENT DOCUMENTS 6,381,460 B1 * 4/2002 Klein et al. .................... 455/450
6,697,628 B1 * 2/2004 Green et al. ............... 455/456.1
(Continued)

FOREIGN PATENT DOCUMENTS

EP 1869152 B1 8/2009
JP 9327072 12/1997
(Continued)

OTHER PUBLICATIONS

International Search Report with translation from PCT/JP2006/322209 mailed Feb. 20, 2007 (5 pages).
(Continued)

*Primary Examiner* — Tilahun B Gesesse
(74) *Attorney, Agent, or Firm* — Osha Liang LLP

(57) ABSTRACT

In a radio communication system defining a plurality of bandwidths, mobile terminals of kinds respectively corresponding to the plurality of bandwidths are accommodated in the system, and a minimum transmission bandwidth of the plurality of bandwidths is set as a transmission bandwidth of a downlink common channel. Or, every mobile terminal accommodated in the radio communication system is provided with a capability for processing a bandwidth equal to or greater than a predetermined value, and equal to or more than two transmission bandwidths that are equal to or less than a predetermined value are set as a transmission bandwidth of a downlink common channel. In the latter case, the mobile terminal identifies a bandwidth of a received downlink common channel.

7 Claims, 16 Drawing Sheets

(51) Int. Cl.
*H04W 72/04* (2009.01)
*H04B 1/707* (2011.01)
*H04L 5/00* (2006.01)
*H04W 74/08* (2009.01)

(56) References Cited

U.S. PATENT DOCUMENTS

| | | | |
|---|---|---|---|
| 6,907,243 B1 * | 6/2005 | Patel | 455/442 |
| 6,925,068 B1 * | 8/2005 | Stanwood et al. | 370/329 |
| 6,985,455 B1 * | 1/2006 | Heath et al. | 370/316 |
| 7,567,502 B2 * | 7/2009 | Laroia et al. | 370/208 |
| 7,808,884 B2 * | 10/2010 | Jitsukawa et al. | 370/208 |
| 8,125,946 B2 * | 2/2012 | Csapo | 370/329 |
| 8,134,996 B2 | 3/2012 | Onggosanusi et al. | |
| 8,243,665 B2 * | 8/2012 | Lee et al. | 370/329 |
| 8,682,246 B2 * | 3/2014 | Desai et al. | 455/41.2 |
| 2002/0080816 A1 * | 6/2002 | Spinar et al. | 370/449 |
| 2002/0119781 A1 * | 8/2002 | Li et al. | 455/450 |
| 2003/0072331 A1 * | 4/2003 | Jou | 370/503 |
| 2004/0121780 A1 | 6/2004 | Nasshan | |
| 2007/0202904 A1 | 8/2007 | Cheng et al. | |
| 2008/0101214 A1 * | 5/2008 | Jitsukawa et al. | 370/208 |
| 2008/0233875 A1 * | 9/2008 | Desai et al. | 455/41.2 |
| 2009/0258647 A1 * | 10/2009 | Yamada et al. | 455/435.1 |
| 2011/0013585 A1 * | 1/2011 | Jitsukawa et al. | 370/330 |

FOREIGN PATENT DOCUMENTS

| | | |
|---|---|---|
| JP | 2000-174767 A | 6/2000 |
| JP | 2002-543675 A | 12/2002 |
| JP | 2003-527789 A | 9/2003 |
| JP | 2004529563 A | 9/2004 |
| JP | 2005502218 | 1/2005 |
| JP | 2008-535981 A | 9/2008 |
| WO | 2005089006 A1 | 9/2005 |

OTHER PUBLICATIONS

Written Opinion from PCT/JP2006/322209 mailed on Feb. 8, 2007 (5 pages).
Office Action in Taiwanese Patent Application No. 095140169 mailed Oct. 7, 2010, with English translation thereof.
Japanese Office Action for Application No. 2005-317572, mailed on Jun. 7, 2011 (8 pages).
NTT DOCOMO, "Physical Channel Concept for Scalable Bandwidth in Evolved UTRA Downlink", 3GPP TSG RAN WG1 Ad Hoc on LTE, R1-050592, Sophia Antipolis, France, Jun. 20-21, 2005.
Texas Instruments; "RACH Preamble Design"; 3GPP TSG RAN WG1 Meeting #42, R1-050777; London, UK; Aug. 29-Sep. 2, 2005 (17 pages).
Patent Abstract for Japanese Patent Application No. 2008-535981 (1 page), Sep. 4, 2008.
Office Action issued in corresponding Japanese Application No. 2011-173367, mailed Jul. 30, 2013 (5 pages).
Motorola; "Aspects of UE Implementation Requirements for EUTRA"; 3GPP TSG RAN LTE Joint WG Meeting, REV-05004; Tokyo, Japan; Mar. 7-8, 2005 (6 pages).
Nokia; "Spectrum usage and requirement on single BW operation"; TSG-RAN WGs meeting on UTRA UTRAN LT evolution, REV-05031; Tokyo, Japan; Mar. 7-8, 2005 (2 pages).
Office Action issued in corresponding Japanese Application No. 2011-173366, mailed Aug. 6, 2013 (5 pages).
Espacenet Patent abstract for WO2005/089006 A1 (1 page), Sep. 22, 2005.
3GPP TSG RAN WG1 Ad Hoc on LTE, Sophia, Antipolis, France Jun. 20-21, 2005 (14 pages).
Extended European Search Report in counterpart European Application No. 14164769.3 issued on Jun. 2, 2014 (7 pages).
Extended European Search Report in conterpart European Application No. 14164717.2 issued on Jun. 2, 2014 (6 pages).
Office Action in counterpart Japanese Patent Application No. 2011-173367 mailed on Apr. 30, 2014 (5 pages).

* cited by examiner

FIG.2

| DOWNLINK BANDWIDTH SETTING METHOD 1 | |
|---|---|
| SYSTEM BANDWIDTH | SCH/BCH BANDWIDTH |
| 1.25 MHz | 1.25 MHz |
| 2.5 MHz | 1.25 MHz |
| 5 MHz | 1.25 MHz |
| 10 MHz | 1.25 MHz |
| 20 MHz | 1.25 MHz |

FIG.3A

| DOWNLINK BANDWIDTH SETTING METHOD 2: WHEN EVERY UE HAS AT LEAST 5 MHz RECEPTION BANDWIDTH ||
|---|---|
| SYSTEM BANDWIDTH | SCH/BCH BANDWIDTH |
| 1.25 MHz | 1.25 MHz |
| 2.5 MHz | 2.5(1.25) MHz |
| 5 MHz | 5 MHz |
| 10 MHz | 5 MHz |
| 20 MHz | 5 MHz |

FIG.3B

| DOWNLINK BANDWIDTH SETTING METHOD 2: WHEN EVERY UE HAS AT LEAST 10 MHz RECEPTION BANDWIDTH ||
|---|---|
| SYSTEM BANDWIDTH | SCH/BCH BANDWIDTH |
| 1.25 MHz | 1.25 MHz |
| 2.5 MHz | 2.5(1.25) MHz |
| 5 MHz | 5 MHz |
| 10 MHz | 10 MHz |
| 20 MHz | 10 MHz |

FIG.4

| UPLINK BANDWIDTH SETTING METHOD 1 | | |
|---|---|---|
| SYSTEM BANDWIDTH | DATA CHANNEL MAXIMUM TRANSMISSION BANDWIDTH | PILOT CHANNEL TRANSMISSION BANDWIDTH |
| 1.25 MHz | 1.25 MHz | 1.25 MHz |
| 2.5 MHz | 1.25, 2.5 MHz | 1.25, 2.5 MHz |
| 5 MHz | 1.25, 2.5, 5 MHz | 1.25, 2.5, 5 MHz |
| 10 MHz | 1.25, 2.5, 5, 10 MHz | 1.25, 2.5, 5, 10 MHz |
| 20 MHz | 1.25, 2.5, 5, 10, 20 MHz | 1.25, 2.5, 5, 10, 20 MHz |

FIG.5A

| SYSTEM BANDWIDTH | UPLINK BANDWIDTH SETTING METHOD 2: WHEN MAXIMUM TRANSMISSION BANDWIDTHS OF DATA CHANNEL AND PILOT CHANNEL ARE DIFFERENT | |
|---|---|---|
| | DATA CHANNEL MAXIMUM TRANSMISSION BANDWIDTH | PILOT CHANNEL TRANSMISSION BANDWIDTH |
| 1.25 MHz | 1.25 MHz | 1.25 MHz |
| 2.5 MHz | 1.25, 2.5 MHz | 1.25, 2.5 MHz |
| 5 MHz | 1.25, 2.5, 5 MHz | 5 MHz |
| 10 MHz | 1.25, 2.5, 5, 10 MHz | 5, 10 MHz |
| 20 MHz | 1.25, 2.5, 5, 10, 20 MHz | 5, 10, 20 MHz |

FIG.5B

UPLINK BANDWIDTH SETTING METHOD 2:
WHEN MAXIMUM TRANSMISSION BANDWIDTHS OF DATA CHANNEL
AND PILOT CHANNEL ARE THE SAME (5MHz)

| SYSTEM BANDWIDTH | DATA CHANNEL MAXIMUM TRANSMISSION BANDWIDTH | PILOT CHANNEL TRANSMISSION BANDWIDTH |
| --- | --- | --- |
| 1.25 MHz | 1.25 MHz | 1.25 MHz |
| 2.5 MHz | 1.25, 2.5 MHz | 1.25, 2.5 MHz |
| 5 MHz | 5 MHz | 5 MHz |
| 10 MHz | 5, 10 MHz | 5, 10 MHz |
| 20 MHz | 5, 10, 20 MHz | 5, 10, 20 MHz |

FIG.5C

| SYSTEM BANDWIDTH | UPLINK BANDWIDTH SETTING METHOD 2: WHEN MAXIMUM TRANSMISSION BANDWIDTHS OF DATA CHANNEL AND PILOT CHANNEL ARE THE SAME (10MHz) ||
| --- | --- | --- |
| | DATA CHANNEL MAXIMUM TRANSMISSION BANDWIDTH | PILOT CHANNEL TRANSMISSION BANDWIDTH |
| 1.25 MHz | 1.25 MHz | 1.25 MHz |
| 2.5 MHz | 1.25, 2.5 MHz | 1.25, 2.5 MHz |
| 5 MHz | 5 MHz | 5 MHz |
| 10 MHz | 10 MHz | 10 MHz |
| 20 MHz | 10, 20 MHz | 10, 20 MHz |

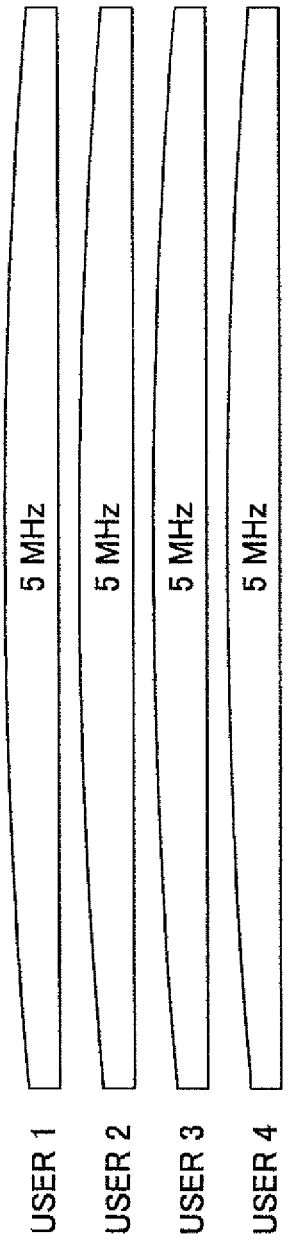

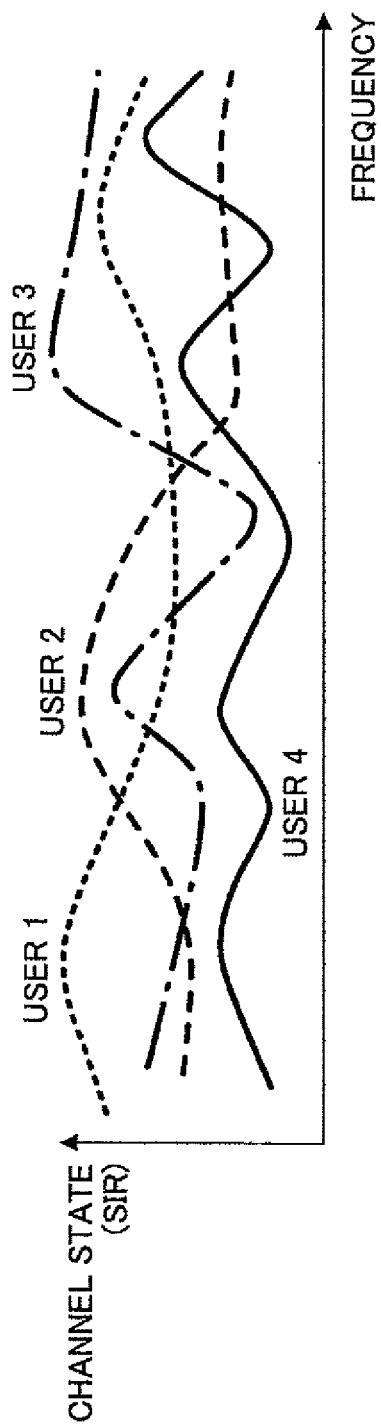

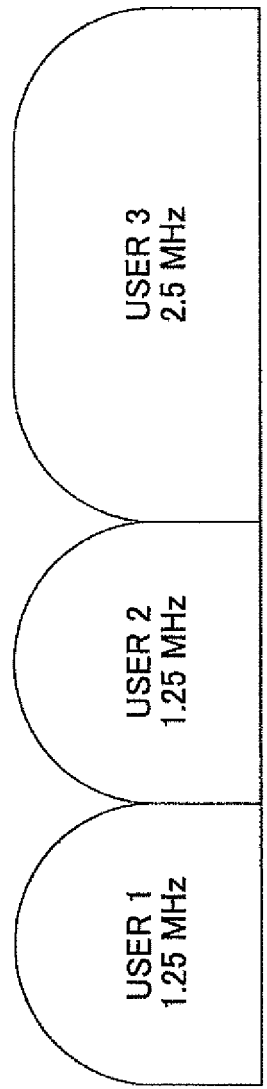

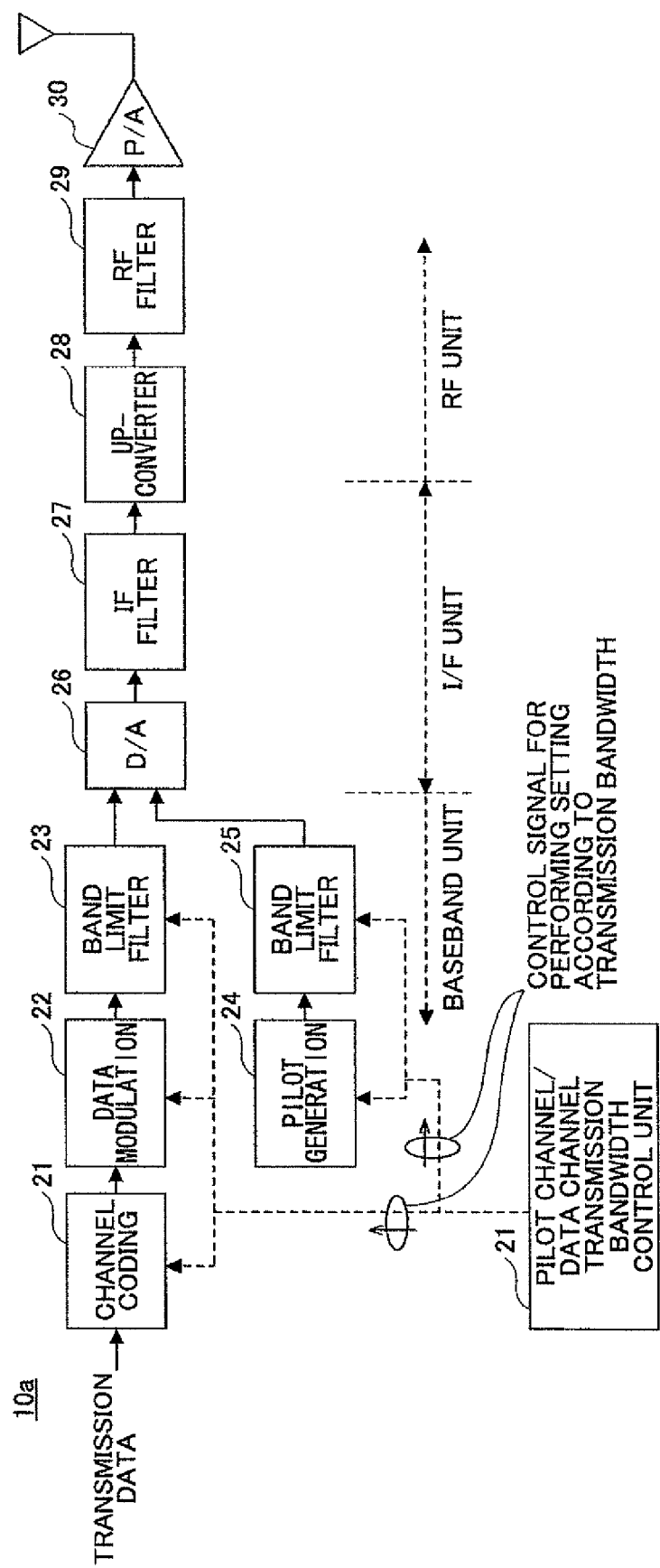

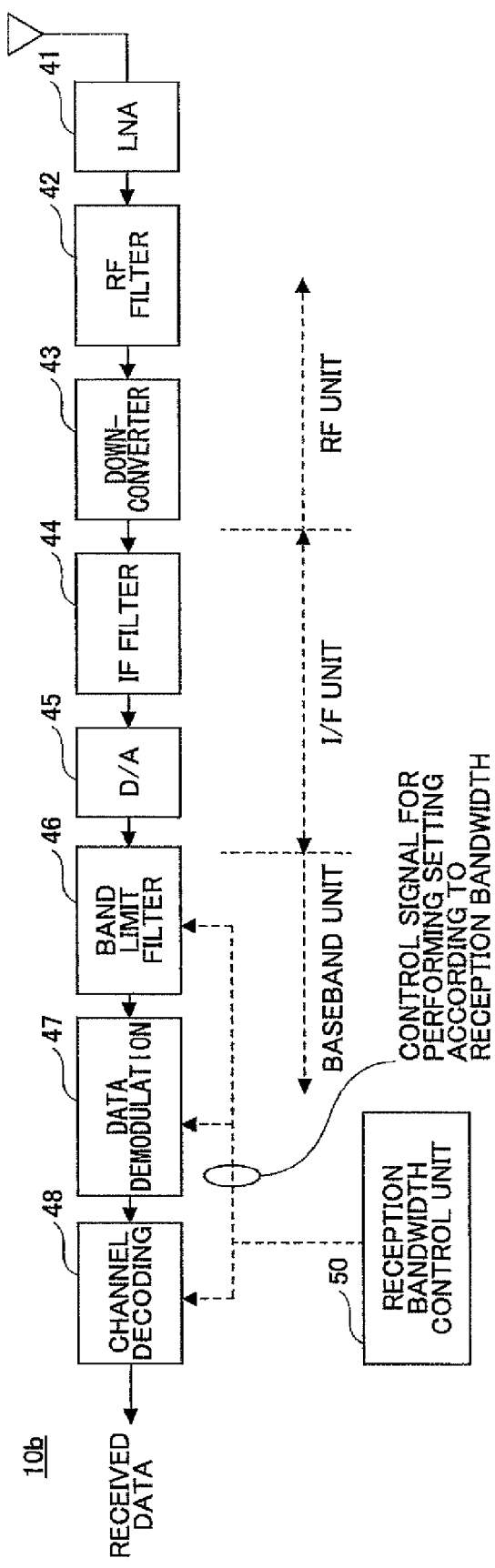

TRANSMISSION AND RECEPTION BANDWIDTH SETTING METHOD, MOBILE TERMINAL AND BASE STATION IN RADIO COMMUNICATION SYSTEM THAT DEFINES A PLURALITY OF SIGNAL BANDWIDTHS

CROSS-REFERENCE TO RELATED APPLICATIONS

The present application is a continuation application of and, thereby, claims benefit under 35 U.S.C. §120 to U.S. patent application Ser. No. 12/092,229 filed on Apr. 30, 2008, titled, "TRANSMISSION AND RECEPTION BANDWIDTH SETTING METHOD, MOBILE TERMINAL, AND BASE STATION IN RADIO COMMUNICATION SYSTEM THAT DEFINES A PLURALITY OF SIGNAL BANDWIDTHS," which is a national stage application of PCT Application No. PCT/JP2006/322209, filed on Oct. 31, 2006, which claims priority to Japanese Patent Application No. JP2005-317572 filed on Oct. 31, 2005. The contents of the priority applications are incorporated by reference in their entirety.

TECHNICAL FIELD

The present invention relates to a base station, a mobile terminal, and a signal transmission and reception method used in a radio communication system in which a plurality of different signal bandwidths are defined.

BACKGROUND ART

As a successor of W-CDMA and HSDPA, a communication scheme called Evolved UTRA (E-UTRA) is being studied. The E-UTRA is a radio access scheme that supports a plurality of bandwidths in an extensible manner, and that supports bandwidths from 1.25 MHz up to 20 MHz while maintaining compatibility with the existing 3G scheme.

In the existing W-CDMA, a single bandwidth of 5 MHz is supported in a same system, channels of uplink (from base station to terminal) and downlink (terminal to base station) are allocated so that data to be transferred is transmitted.

DISCLOSURE OF THE INVENTION

Problem to be Solved by the Invention

In contrast, in a system corresponding to E-UTRA, a plurality of bandwidths are defined in a same system, and different bandwidths are supported according to base stations or carriers. That is, a state occurs in which bandwidths being used are different according to systems (cells in a system of a same carrier under certain circumstances) provided by each carrier. In such a state, it is necessary that every mobile terminal can connect to any base stations having different bandwidths.

In addition, a maximum transmission and reception bandwidth that the mobile terminal can support at a minimum is an important problem since it has an influence not only on implementation and configuration of the terminal but also on configuration of a physical channel corresponding to a synchronization channel (SCH) or a broadcast channel (BCH).

In addition, it becomes important to set transmission bandwidths of a collision permissible channel used when initially accessing any base stations, from the mobile terminal, that use different bandwidths, and a pilot channel and a data channel that are transmitted from the mobile terminal to any base station.

Thus, an object of the present invention is to provide a method for setting a proper bandwidth in a downlink and a method for setting a proper bandwidth in an uplink in a radio communication system in which a plurality of bandwidths are defined.

In addition, an object is to provide configuration of the mobile terminal and configuration of the base station according to the bandwidth setting method.

Means for Solving the Problem

To realize the above-mentioned object, on the premise that a plurality of bandwidths are defined in a radio communication system, the present invention provides a reception bandwidth setting method of a common channel in a downlink, a transmission bandwidth setting method of a pilot channel and a data channel in an uplink, the scheduling, and a transmission bandwidth setting method of a collision permissible channel in an uplink, for each of the following cases:

(1) A case in which mobile terminals of all kinds corresponding to the plurality of bandwidths are prepared; and (2) A case in which a maximum bandwidth equal to or greater than a given value is set to every mobile terminal.

In a first aspect, as a first method for setting a bandwidth of a common channel in a downlink, a method for setting a transmission and reception bandwidth in a radio communication system defining a plurality of bandwidths is provided, and the method includes:

(a) accommodating mobile terminals of kinds respectively corresponding to the plurality of bandwidths to the radio communication system; and (b) setting a minimum transmission bandwidth of the plurality of bandwidths as a transmission bandwidth of a downlink common channel.

As a second method, a method for setting a transmission and reception bandwidth in a radio communication system defining a plurality of bandwidths is provided, and the method includes:

(a) providing a processing capability of a bandwidth equal to or greater than a predetermined value to every mobile terminal accommodated in the radio communication system; and (b) setting equal to or greater than two transmission bandwidths equal to or less than the predetermined value as transmission bandwidths of a downlink common channel.

In a second aspect, as a first method for setting bandwidths of a pilot channel and a data channel in an uplink, a method for setting a transmission and reception bandwidth in a radio communication system defining a plurality of bandwidths is provided, and the method includes:

(a) accommodating mobile terminals of kinds respectively corresponding to the plurality of bandwidths to the radio communication system; and (b) setting bandwidths respectively corresponding to the plurality of bandwidths as bandwidths of a pilot channel and as bandwidths of a data channel that are transmitted from the mobile terminal using an uplink.

As a second method, a method for setting a transmission and reception bandwidth in a radio communication system defining a plurality of bandwidths is provided, and the method includes:

(a) accommodating mobile terminals of kinds respectively corresponding to the plurality of bandwidths to the radio communication system regarding transmission bandwidths of a data channel transmitted using an uplink; and (b) providing a processing capability of a transmission bandwidth equal to or greater than a predetermined value to every mobile terminal accommodated in the radio communication system regarding transmission bandwidths of a pilot channel transmitted using an uplink.

As a third method, a method for setting a transmission and reception bandwidth in a radio communication system defining a plurality of bandwidths is provided, and the method includes:

(a) providing capability for processing a transmission bandwidth equal to or grater than a predetermined value, as a transmission bandwidth of a pilot channel and a data channel for an uplink, to every mobile terminal accommodated in the radio communication system; and (b) selecting a transmission bandwidth of the pilot channel and the data channel within a range of a maximum transmission bandwidth of the mobile terminal according to a bandwidth used by the base station in the radio communication system.

In the first to third methods, the transmission bandwidth of the pilot channel is preferably set to be wider than the transmission bandwidth of the data channel in the uplink.

In a third aspect, as a first method for setting a transmission bandwidth of a collision permissible channel in an uplink, a method for setting a transmission and reception bandwidth in a radio communication system defining a plurality of bandwidths is provided, and the method includes:

(a) setting a transmission bandwidth of an uplink collision permissible channel transmitted from any mobile terminal in the radio communication system to be a minimum transmission bandwidth of the plurality of bandwidths.

As a second method, a method for setting a transmission and reception bandwidth in a radio communication system defining a plurality of bandwidths is provided, and the method includes:

(a) setting a transmission bandwidth of an uplink collision permissible channel transmitted from any mobile terminal in the radio communication system within a range of a predetermined bandwidth greater than a minimum transmission bandwidth of the plurality of bandwidths.

In any method, the base station in the radio communication system may specify a transmission band of an uplink collision permissible channel transmitted by the mobile station within a range of a bandwidth used by the base station.

Or, the base station in the radio communication system may predetermine a bandwidth used for receiving an uplink collision permissible channel transmitted from the mobile station within a range of a bandwidth used by the base station.

Or, the base station may randomly change the band for transmitting the collision permissible channel within a range of a bandwidth used by the base station which the mobile station tries to access.

In a fourth aspect, a mobile terminal apparatus used in a radio communication system defining a plurality of bandwidths is provided. The mobile terminal apparatus includes:

(a) a control unit configured to set transmission bandwidths of an uplink pilot channel and an uplink data channel that are transmitted to a base station to perform channel generation control according to the established transmission bandwidths.

In a preferred configuration example, the control unit sets an uplink transmission bandwidth so as to transmit the uplink pilot channel using a bandwidth wider than that of the uplink data channel.

In a fifth aspect, a mobile terminal apparatus used in a radio communication system defining a plurality of bandwidths includes:

(a) a capability for processing a bandwidth, of the plurality of bandwidths, equal to or greater than a predetermined value; and (b) a reception bandwidth control unit configured to identify a bandwidth of a downlink common channel received from any base station in the radio communication system to control processes of a received signal according to the identified bandwidth.

In a sixth aspect, a base station used in a radio communication system defining a plurality of bandwidths is provided. The base station includes:

(a) a reception unit configured to receive pilot channels of a first bandwidth from a plurality of mobile terminals;

(b) a measurement unit configured to measure channel states on a frequency axis based on the received pilot channels; and (c) a transmission band assignment unit configured to assign a transmission band of a data channel using a second bandwidth narrower than the first bandwidth to each mobile terminal based on the measurement result.

Effect of the Invention

According to the present invention, a proper transmission and reception bandwidth can be set in the downlink and the uplink in a radio communication system defining a plurality of bandwidths.

BRIEF DESCRIPTION OF THE DRAWINGS

FIG. 2 is a diagram for showing a downlink bandwidth setting method in a case for accommodating mobile terminals of kinds corresponding to all bandwidths supported by the radio communication system in the system shown in FIG. 1;

FIG. 3A is a diagram for showing a downlink bandwidth setting method in a case for providing a capability for supporting a maximum transmission bandwidth equal to or greater than a given value to every mobile terminal in the system shown in FIG. 1;

FIG. 3B is a diagram for showing a downlink bandwidths setting method in a case when providing a capability for supporting a maximum transmission bandwidth equal to or greater than a given value to every mobile terminal in the system shown in FIG. 1;

FIG. 4 is a diagram for showing an uplink bandwidth setting method in a case when accommodating mobile terminals of kinds corresponding to all bandwidths supported by the radio communication system in the system shown in FIG. 1;

FIG. 5A is a diagram for showing an uplink bandwidth setting method in a case when providing a capability for supporting a maximum transmission bandwidth equal to or greater than a given value to every mobile terminal in the system shown in FIG. 1;

FIG. 5B is a diagram for showing an uplink bandwidth setting method in a case when providing a capability for supporting a maximum transmission bandwidth equal to or greater than a given value to every mobile terminal in the system shown in FIG. 1;

FIG. 5C is a diagram for showing an uplink bandwidth setting method in a case when providing a capability for supporting a maximum transmission bandwidth equal to or greater than a given value to every mobile terminal in the system shown in FIG. 1;

FIG. 7A is a diagram for explaining a method for performing uplink scheduling based on a received pilot channel in a base station;

FIG. 7B is a diagram for explaining a method for performing uplink scheduling based on a received pilot channel in a base station;

FIG. 7C is a diagram for explaining a method for performing uplink scheduling based on a received pilot channel in a base station;

FIG. 8 is a block diagram showing an example of a transmitter configuration of a mobile terminal used by a radio communication system supporting a plurality of bandwidths;

FIG. 9 is a block diagram showing an example of a receiver configuration of a mobile terminal used by a radio communication system supporting a plurality of bandwidths;

Figure 1:
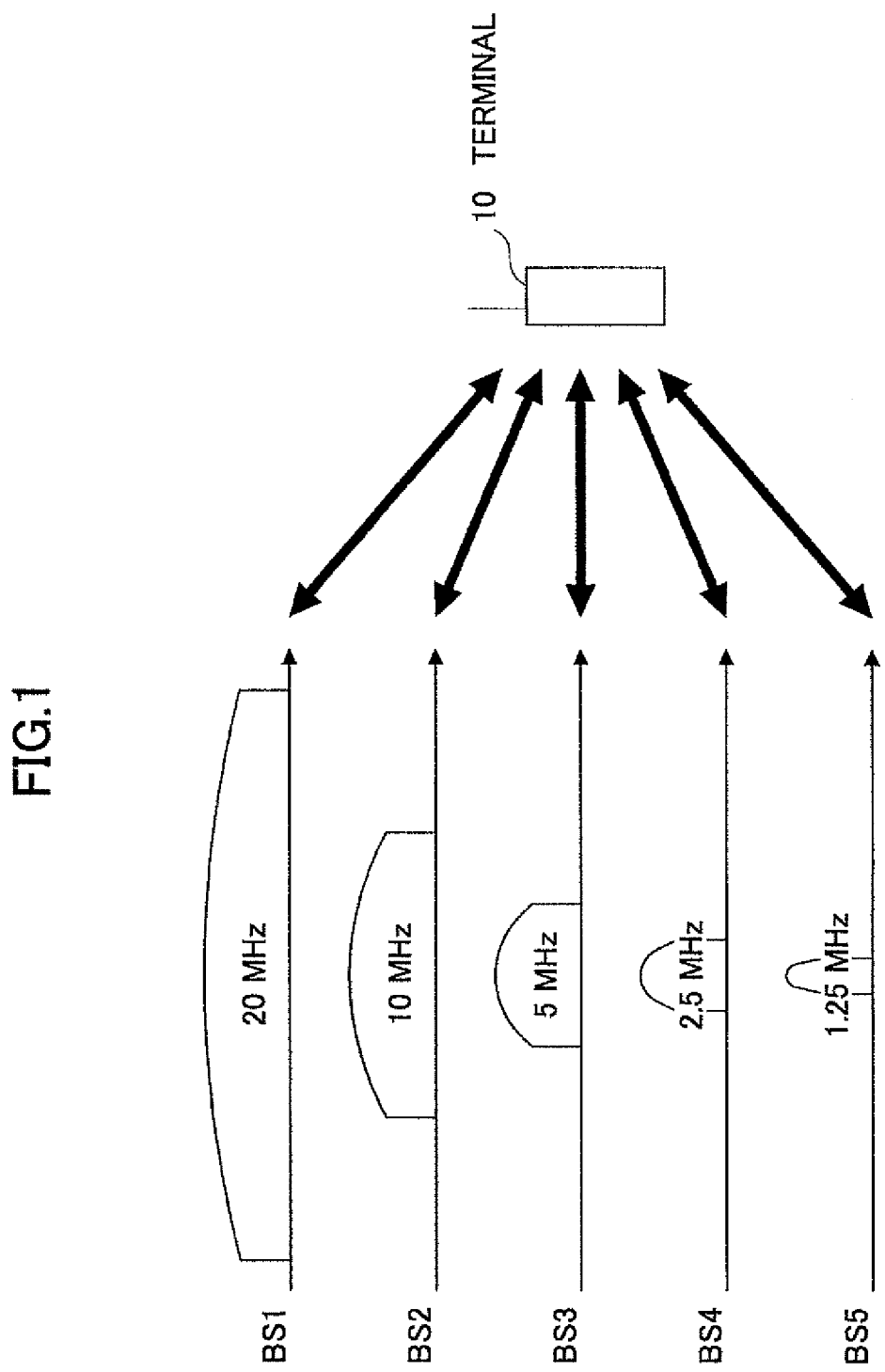
FIG. 1 is a diagram for explaining a radio communication system supporting a plurality of bandwidths on which the present invention is predicated.

DESCRIPTION OF REFERENCE SIGNS 10 mobile terminal
10a transmitter of the mobile terminal
10b receiver of the mobile terminal
21 pilot channel/data channel transmission bandwidth control unit of the mobile terminal
50 reception bandwidth control unit of the mobile terminal
60 base station
61 pilot channel reception unit
62 channel state measurement unit
63 data channel transmission band assignment unit

PREFERRED EMBODIMENTS FOR CARRYING OUT THE INVENTION

Before describing the preferred embodiments, an overview of the radio communication system on which the present invention is based is described with reference to FIG. 1. The present invention is predicated on a system in which a plurality of bandwidths are defined in a same system. Therefore, transmission bandwidths of the downlink and reception bandwidths of the uplink are different according to base stations (or carriers). Every mobile terminal should connect to any of base stations having different bandwidths while moving.

In FIG. 1, the radio communication system includes base stations 1-5 using different transmission bandwidths that are 20 MHz, 10 MHz, 5 MHz, 2.5 MHz and 1.25 MHz, for example. The transmission frequency bandwidth used by each base station is determined based on a frequency spectrum that each carrier can use. Assuming that there are a plurality of bandwidths in such a same system, in order to connect the mobile terminal 10 to any base station, following items should be considered:

(1) Transmission of a common channel from a base station to a mobile station in the downlink, and setting of a maximum bandwidth of a mobile terminal 10;

(2) Transmission of a pilot channel and a data channel in the uplink, and scheduling for them; and (3) Transmission of collision permissible type channel in the uplink. In the following, each of them are described.

<Transmission of Common Channel and Setting of Maximum Bandwidth of the Mobile Terminal in the Downlink>

In the downlink of the radio communication system that supports a plurality of transmission bandwidths, following two methods can be considered as methods for setting bandwidths such that the mobile terminal 10 can receive the common (physical) channel from any base station. That are methods of:

(i) Preparing mobile terminals 10 of all kinds that correspond to all of the bandwidths supported by the system, and transmitting the downlink common (physical) channel using a minimum bandwidth in the plurality of bandwidths supported by the system, or (ii) Setting a maximum bandwidth that every mobile terminal 10 should support as a minimum value, and transmitting the downlink common (physical) channel using equal to or more than two bandwidths that are equal to or less than the bandwidth of the minimum value.

In the first method, for example, as shown in FIG. 1, when the radio communication system supports five kinds of bandwidths, five kinds of mobile terminals 10 that are a mobile terminal supporting 1.25 MHz, a mobile terminal supporting 2.5 MHz, a mobile terminal supporting 5 MHz, a mobile terminal supporting 10 MHz, and a mobile terminal supporting 20 MHz are prepared, and they are accommodated in the system.

In this case, since there is a mobile terminal 10 that can receive only a signal of the signal bandwidth of 1.25 MHz, every base station transmits a physical channel corresponding to a common channel such as the synchronization channel (SCH) and the broadcast channel (BCH) using a bandwidth of 1.25 MHz that is the smallest bandwidth in the system irrespective of a bandwidth of the system used in the cell.

In the second method, every mobile terminal has at least a given maximum bandwidth. For example, every mobile terminal 10 is designed to have a bandwidth of 5 MHz at least, or a bandwidth of 10 MHz at least.

According to this method, since every mobile terminal 10 that is accommodated in the system can support a maximum bandwidth that is equal to or greater than a given value, it is only necessary that the base station transmits the common channel using a bandwidth equal to or less than the given maximum bandwidth in a plurality of bandwidths defined in the system.

FIG. 2 is a diagram for explaining the first method (i) for setting the downlink signal bandwidth in more detail. As shown in the left side of FIG. 2, the radio communication system supports five different kinds of system bandwidths depending on cells and accommodates mobile terminals 10 of kinds that correspond to all bandwidths. In this case, as shown in the right side of FIG. 2, the transmission bandwidth of the common channel (SCH, BCH, and the like) in each cell is 1.25 MHz in accordance with the smallest bandwidth in the system irrespective of system bandwidth that the cell can use.

According to this scheme, every kind of mobile terminal 10 can receive a common channel from a base station even though the mobile terminal 10 moves to any cell.

In addition, since every base station transmits the synchronization channel or the broadcast channel using the same minimum signal bandwidth, methods of demodulation and decoding of the common channel in the mobile terminal 10 becomes simple and unified. In addition, since terminals of the existing W-CDMA scheme and UMTS (W-CDMA)/GMS dual mode terminals have a 5 MHz downlink physical channel receiving capability, there is an advantage of commonality between the existing systems and the new system so that it can be considered that dual mode of both systems can be easily realized.

FIGS. 3A and 3B are diagrams for describing the second method (ii) for setting the downlink signal bandwidth in more detail. In the example of FIG. 3A, the maximum bandwidth that every mobile terminal 10 should support at the minimum is set to be 5 MHz, and in the example of FIG. 3B, it is set to be 10 MHz.

In FIG. 3A, the left side indicates five kinds of bandwidths that the system supports, and the right side indicates signal bandwidths used for each base station to transmit the common channel when every mobile terminal 10 has the maximum bandwidth of 5 MHz at the minimum. A base station (carrier) that uses a bandwidth of 1.25 MHz transmits the common channel using the bandwidth. A base station that uses a bandwidth of 2.5 MHz transmits the common channel using 2.5 MHz or 1.25 MHz. Since the mobile terminal 10 supports a bandwidth of 5 MHz at the minimum, the mobile terminal 10 can receive the common channel from the base station in either case.

Base stations using bandwidths of 5 MHz, 10 MHz and 20 MHz transmit the common channel using 5 MHz in accordance with the maximum bandwidth of the minimum value kept in every mobile terminal 10. Since the common channel is transmitted using the bandwidth of 5 MHz, high diversity effect can be obtained. Therefore, reception quality when the mobile terminal 10 receives the channel. In addition, dual mode with the existing W-CDMA can be easily realized.

In the system of FIG. 3A, since the downlink common channel is transmitted using 5 MHz or 1.25 MHz (or 2.5 MHz) according to the base station, it is necessary to set more than one kind of format of the common channel in the radio communication system. In addition, it is necessary to detect and identify the bandwidth of the common channel before demodulating and decoding SCH or BCH in the mobile terminal 10. As a method for realizing this, there is a method in which the base station reports information on the bandwidth used for transmitting the common channel such as SCH and BCH to the mobile terminal 10 beforehand by separately preparing a control channel of 1.25 MHz, for example. Alternatively, a configuration may be adopted in which when information of a band of 1.25 MHz in SCH or BCH is decoded and when it is recognized that there is SCH or BCH of 5 MHz band based on the decoded information, information of the band of 5 MHz is decoded again. Alternatively, a configuration may be adopted in which the mobile terminal 10 estimates the parameter (bandwidth) using a blind method.

As to FIG. 3B, although FIG. 3B is similar to FIG. 3A, since every mobile terminal 10 supports the maximum reception bandwidth of 10 MHz at the minimum, a base station using a 5 MHz bandwidth transmits the common channel using 5 MHz, and a base station using a bandwidth of 10 MHz or 20 MHz transmits the common channel using 10 MHz that is the reception bandwidth of the minimum value of the mobile terminal 10. Also in this case, the mobile terminal 10 has a function of identifying the bandwidth of the common channel. That is, in the same way as the example of FIG. 3A, the bandwidth of the downlink common channel is identified by reporting bandwidth information using a control channel of the lowest bandwidth (1.25 MHz, for example) supported by the system or by estimating bandwidth using the blind method.

According to the method of FIG. 3, since every mobile terminal 10 has the maximum reception bandwidth equal to or greater than a given level, kinds and performance of mobile terminals 10 can be unified. In addition, improvement of reception quality due to diversity effect can be expected.

By the way, in the examples shown in FIGS. 3A and 3B, although SCH and BCH are transmitted using a same bandwidth, it is not necessary to use the same bandwidth. For example, a base station having a bandwidth of 2.5 MHz may transmit BCH using 2.5 MHz and transmit SCH using 1.25 MHz.

<Transmission Bandwidth and Transmission Schedule in Uplink>

Next, transmission bandwidths of a pilot channel and a data channel in the uplink, and the scheduling are described. As methods for setting bandwidths for transmitting a pilot channel and a data channel to any base station by the mobile terminal 10 in the uplink of the radio communication system, there are the following two methods like the case of the downlink common channel. That is:

(i) Preparing mobile terminals 10 of kinds corresponding to all bandwidths supported by the system; or (ii) Setting a maximum bandwidth that every mobile terminal 10 should support as a minimum value.

FIG. 4 shows a method for setting transmission bandwidth of the uplink when the first method is adopted, that is, when mobile terminals 10 of kinds corresponding to all bandwidths are accommodated. The left side shows five kinds of bandwidths supported by the radio communication system. The center section shows maximum bandwidths, for transmitting a data channel from the mobile terminal 10, that can be processed in the corresponding cell. The right side shows transmission bandwidths of a pilot channel from the mobile terminal 10 that can be processed in the corresponding cell.

Since all kinds of mobile terminals 10 corresponding to a plurality of kinds of maximum transmission bandwidths from 1.25 MHz to 20 MHz are accommodated in the uplink, each mobile terminal 10 transmits, to any base station, within a range of a bandwidth supported by the own mobile terminal, a pilot signal and a data signal according to a system bandwidth supported by the base station. For example, in a cell using a bandwidth of 2.5 MHz, a mobile terminal 10 supporting a bandwidth of 5 MHz transmits the pilot signal or the data signal using 2.5 MHz of the 5 MHz. When the mobile terminal 10 moves to a cell using a bandwidth equal to or greater than 5 MHz, the mobile terminal 10 transmits the pilot signal or the data signal using a bandwidth of 5 MHz.

Figure 6A:
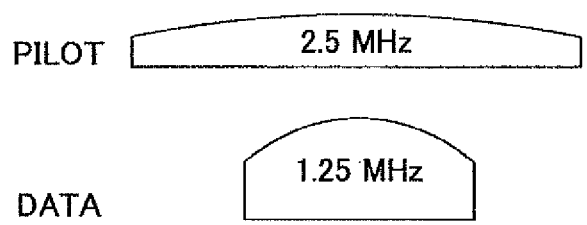
FIG. 6A is a diagram showing an example for transmitting a pilot channel using a bandwidth wider than that of a data channel in an uplink.
Figure 6B:
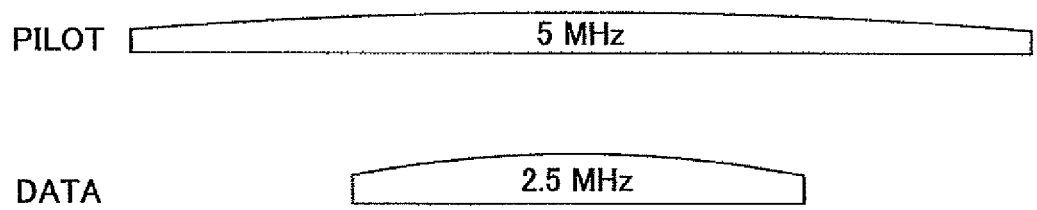
FIG. 6B is a diagram showing an example for transmitting a pilot channel using a bandwidth wider than that of a data channel in an uplink.

By the way, it is desirable that the mobile terminal 10 that supports a bandwidth equal to or greater than 2.5 MHz transmits a pilot channel using a bandwidth greater than that used for a data channel. For example, as shown in FIG. 6A, the pilot channel is transmitted using 2.5 MHz, and the data channel is transmitted using 1.25 MHz. Alternatively, as shown in FIG. 6B, the pilot channel is transmitted using 5 MHz, and the data channel is transmitted using 2.5 MHz. By adopting such a configuration, the base station side can perform scheduling according to a channel state (SIR and the like) on the frequency axis using the received pilot channel. Details of the scheduling using the pilot channel are described later.

FIGS. 5A-5C show a method for setting the uplink transmission bandwidth when the second method is adopted, that is, when a maximum transmission bandwidth as minimum value is set for every mobile terminal 10. In the example shown in FIG. 5A, although every mobile terminal 10 supports 5 MHz at the minimum for transmitting the pilot channel, maximum transmission bandwidths for the data channel (and control channel) are set in accordance with all kinds of bandwidths. On the other hand, in the example of FIG. 5B, every mobile terminal 10 supports a transmission bandwidth of 5 MHz at the minimum for both of the pilot channel and the data channel. In the example of FIG. 5C, every mobile terminal 10 supports a transmission bandwidth of 10 MHz at the minimum for both of the pilot channel and the data channel.

In the example of FIG. 5A, as to transmission of a data channel, mobile terminals 10 of kinds corresponding to all bandwidths supported by the system are prepared. But, as to transmission of pilot channel, the maximum bandwidth of at least 5 MHz is kept for every mobile terminal 10. For example, as shown in FIG. 6B, in a cell that supports a bandwidth equal to or greater than 5 MHz, the mobile terminal 10 transmits a pilot channel using 5 MHz, and transmits a data channel using a bandwidth of 2.5 MHz according to scheduling from the base station. In a cell supporting 2.5 MHz, as shown in FIG. 6A, a pilot channel is transmitted using 2.5 MHz of the 5 MHz, and a data channel is transmitted using a bandwidth of 1.25 MHz according to scheduling of the base station.

FIGS. 7A-7C are diagrams for describing scheduling using the pilot channel. It is assumed that every mobile terminal 10 can use a maximum transmission bandwidth of 5 MHz at the minimum for transmitting the pilot channel. As shown in FIG. 7A, each of mobile terminals of users 1-4 transmits a pilot channel using a bandwidth of 5 MHz in a cell (step 1).

As shown in FIG. 7B, when the base station receives pilot signals from the users 1-4, the base station measures channel states of the mobile terminals 10 of each user on the frequency axis (step 2). For example, the pilot channel from the mobile terminal of the user 1 indicates a good channel state in the first half part of the 5 MHz bandwidth. The pilot channel of the user 2 indicates the peak in a side a little lower than the center of the 5 MHz bandwidth. The pilot channel of the user 3 indicates a good channel state in the latter half part of the 5 MHz bandwidth.

As shown in FIG. 7C, based on the measured channel states, the base station assigns data channels of bandwidths each narrower than the pilot channel on the frequency axis to the users 1, 2 and 3. In the example of FIG. 7C, the base station assigns first 1.25 MHz of the 5 MHz bandwidth to the user 1, assigns next 1.25 MHz to the user 2, and assigns the latter half 2.5 MHz to the user 3. At this time, there is no assignment for user 4. The bandwidth to be assigned for transmission of the data channel for each user can be determined based on information (capability) of a maximum transmission bandwidth of terminal transmitted from the mobile terminal. The mobile terminal of each user transmits the data channel using a band narrower than that of the pilot channel based on an assignment instruction from the base station (step 3).

Accordingly, even though a mobile terminal has low capability for transmitting the data channel, a predetermined maximum transmission bandwidth (5 MHz, for example) is kept for every mobile terminal 10 as to transmission of the pilot channel, and the bandwidth for transmitting the data channel is set to be smaller than that so that efficient scheduling according to channel states becomes possible. As a result, throughput of the system improves.

Returning to FIG. 5B, in this example, every mobile terminal 10 has a maximum transmission bandwidth of 5 MHz at least for both of the pilot channel and the data channel. In the example of FIG. 5C, every mobile terminal 10 has a maximum transmission bandwidth of 10 MHz at least for both of the pilot channel and the data channel. In either case, like the case of FIG. 5A, the base station can perform transmission scheduling of the data channels in bands each narrower than that of the pilot channel based on received pilot channels, so that throughput of the system can be improved.

FIG. 8 is a block diagram showing a transmitter 10a of the mobile terminal 10. A baseband unit of the transmitter 10a includes, as a data channel processing system, a channel coding unit 21 for coding transmission data that is input, a data modulation unit 22 and a band limit filter 23, and includes, as a pilot channel processing system, a pilot signal generation unit 24 and a band limit filter 25.

When uplink scheduling is performed in the base station like the case shown in FIGS. 7A-7C, the mobile terminal 10 transmits a pilot channel and a data channel of different bandwidths. In this case, a pilot channel/data channel transmission bandwidth control unit 31 controls the transmission bandwidths of the pilot channel and the data channel within a range of the maximum reception bandwidth of the base station that is reported by a downlink control channel. As methods for control, there are a method of setting transmission bandwidth of the data channel based on the transmission bandwidth specified by the scheduling from the base station using the method shown in FIGS. 7A-7C, and a method of setting transmission bandwidths of the pilot channel and the data channel selected by the control unit 31 itself.

Each of a pilot channel signal and a data channel signal on which baseband processing has been performed is received by a D/A converter 26 of the IF unit so as to pass through an IF filter 27. When transmission bandwidths of the pilot and the data are different, the bandwidth of the IF filter 27 is adjusted to the transmission bandwidth of the pilot. Output of the IF filter 27 is received by an up converter 28 of the RF unit so as to be converted to a RF frequency according to an uplink transmission frequency band that is set. By the way, a part of this function may be performed by the baseband unit. The RF-converted signal passes through the RF filter 29. When transmission bandwidths of the pilot and the data are different, the bandwidth of the RF filter 27 is adjusted to the transmission bandwidth of the pilot. Output of the RF filter 27 is amplified by a power amplifier 30. Since transmission power of the data channel is larger than that of the pilot channel, the size of the power amplifier is determined according to the transmission bandwidth of the data channel. The amplified transmission signal is transmitted from the transmission antenna.

FIG. 9 is a block diagram of a receiver 10b of the mobile terminal 10. A RF signal received by the antenna passes through a low noise amplifier (LNA) 41 and a RF filter 42, and is converted into an intermediate frequency by a down converter 43 in the RF unit. Next, in the IF unit, the signal passes through an IF filter 44 and is converted into an analog signal by a D/A converter 45. In the baseband unit, the signal is filtered, demodulated and decoded by a band limit filter 46, a data demodulation unit 47 and a channel decoding unit 48. When the maximum reception bandwidth of 5 MHz is kept in every mobile terminal 10 at the minimum, dual mode operation with the existing W-CDMA is easy for the RF filter 42 and the IF filter 44.

In addition, when a maximum reception bandwidth equal to or greater than a given value is kept for the mobile terminal 10, since a bandwidth of the common channel received from a base station is different according to a bandwidth used in the cell, it is necessary to perform filtering, demodulation and decoding processes in accordance with the bandwidth. A reception bandwidth control unit 50 supplies a control signal for performing settings according to the reception bandwidth to the band limit filter 46, the data demodulation unit 47 and the channel decoding unit 48. The reception bandwidth control unit 50 performs control based on bandwidth information reported by a downlink control channel, for example. Alternatively, although not shown in the diagram, a parameter estimation unit may be provided to estimate the bandwidth.

Figure 10:
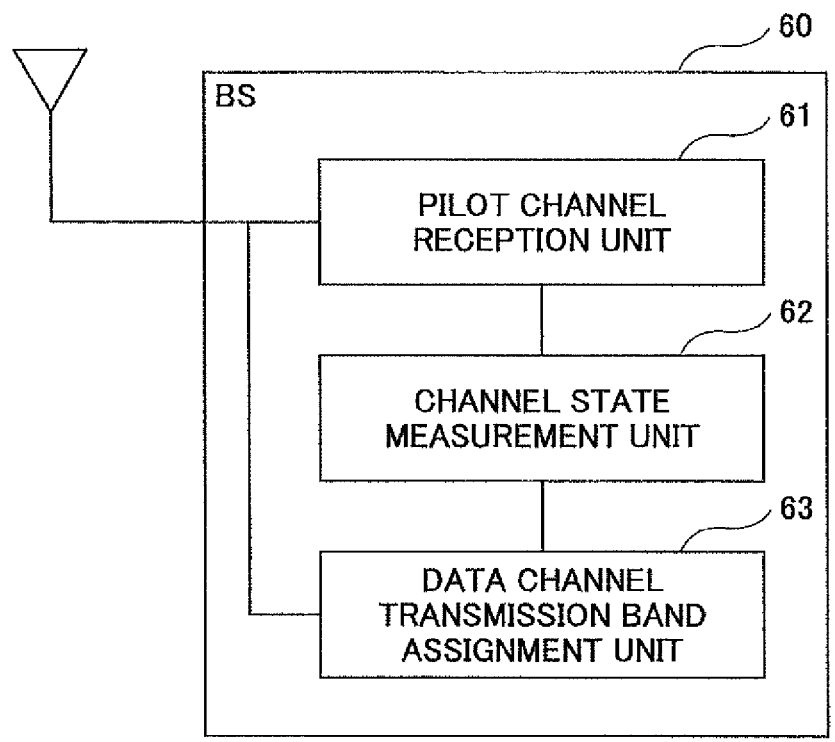
FIG. 10 is a block diagram showing a configuration example of a base station in a case when performing uplink scheduling.

FIG. 10 is a block diagram showing a configuration example of a base station used in a radio communication system that supports a plurality of bandwidth. The base station 60 includes a pilot signal reception unit 61 for receiving a pilot signal of a first bandwidth from the mobile terminal 10, a channel measurement unit 62 for measuring a channel state of each mobile terminal on the frequency axis based on the received pilot channel, and a data channel transmission bandwidth assignment unit 63 for assigning a transmission band of a data channel using a second bandwidth that is narrower than the first bandwidth to each of mobile terminals based on the measurement result.

This configuration of the base station is useful when a configuration is adopted in which every mobile terminal has a maximum transmission bandwidth equal to or greater than a given value. This is because uplink scheduling can be performed based on the pilot channel as shown in FIG. 7.

<Setting of Collision Permissible Channel in the Uplink>

Figure 11A:
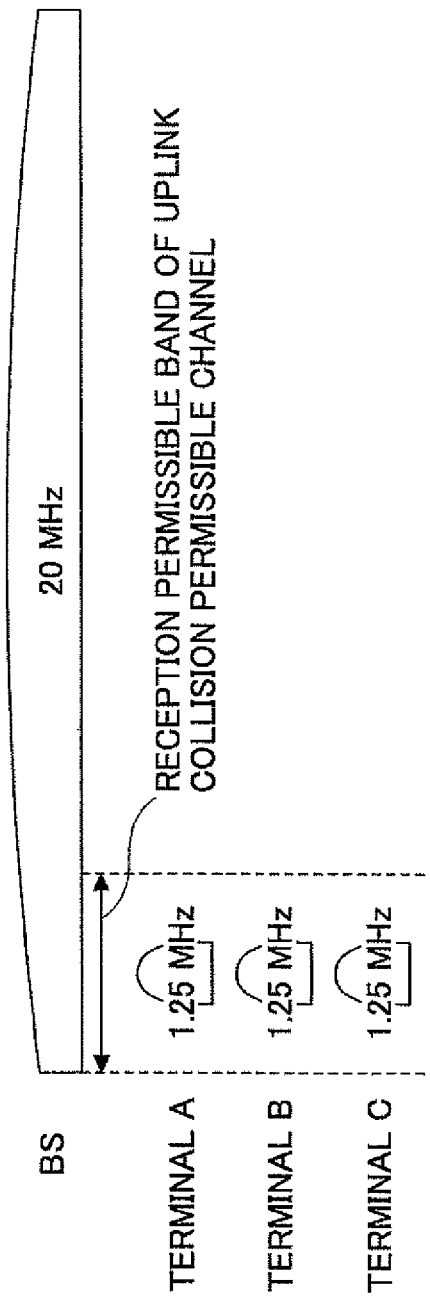
FIG. 11A is a diagram for explaining a method for transmitting a collision permissible channel in an uplink.
Figure 11B:
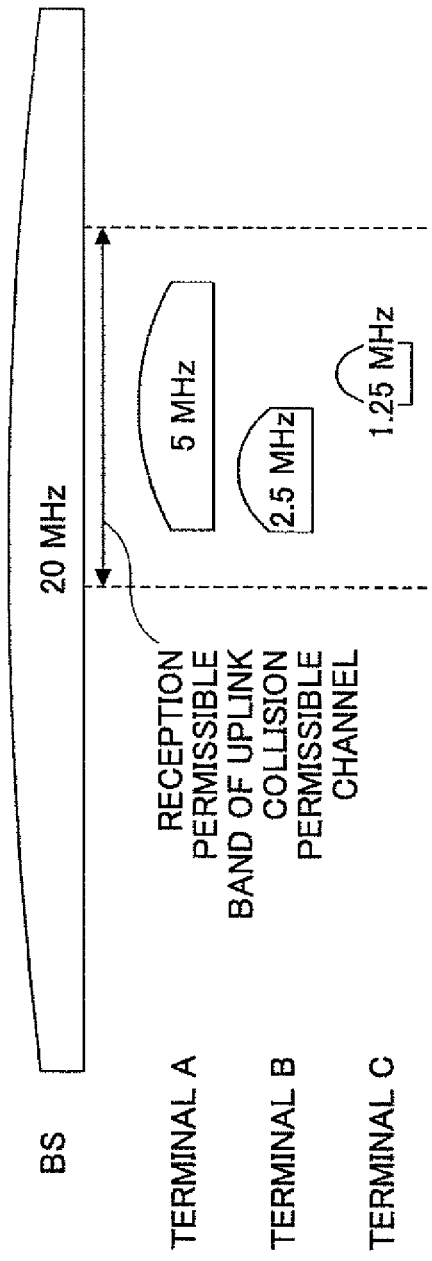
FIG. 11B is a diagram for explaining a method for transmitting a collision permissible channel in an uplink.

FIGS. 11A and 11B are diagrams for describing a transmission method of an uplink collision permissible channel when the mobile terminal 10 accesses a base station initially in a radio communication system supporting a plurality of bandwidths. When the mobile terminal initially accesses the base station, the mobile terminal transmits a collision permissible channel such as a reservation channel and a random access channel based on the premise of the possibility of collision. When the radio communication system supports a plurality of bandwidth, it is necessary to consider the transmission method of the collision permissible channel since bandwidths used by base stations and capabilities of mobile terminals are different.

FIG. 11A shows a method for setting a minimum bandwidth (1.25 MHz, for example) supported by the radio communication system to be a bandwidth of the collision permissible channel. Since the bandwidth of the collision permissible channel is uniformly determined, every base station receives the collision permissible channel using a same method, so that system design becomes easy. This method may be applied to a case for accommodating mobile terminals of kinds supporting all bandwidths supported by the system, and also applied to a case for setting a maximum transmission bandwidth equal to or greater than a minimum value for every mobile terminal.

In the example of FIG. 11A, the base station can use a bandwidth of 20 MHz. When accessing the base station initially, every mobile terminal (A, B, C) transmits the collision permissible channel using 1.25 MHz that is the minimum bandwidth of the system.

As a method for transmitting the collision permissible channel, there are methods of:

(1) Specifying, to the mobile terminal, using a control channel and the like, a band by which transmission of the collision permissible channel is allowed in the whole bandwidth used by the base station;

(2) In the base station, determining beforehand a band, in the whole bandwidth, by which transmission of the collision permissible channel is allowed;

(3) In the mobile terminal side, randomly determining a band for transmitting the collision permissible channel within a range of the bandwidth used by the base station which the mobile station tries to access.

In the first method, the base station assigns bandwidths, that are unoccupied as a result of scheduling, for example, to the terminals A, B, and C as transmission bandwidths of the collision permissible channel.

In the second method, a reception permissible bandwidth of the uplink collision channel is determined beforehand as shown in the arrows of both directions so that reception is performed within the band. In this case, a configuration may be adopted in which the reception permissible bandwidth of the uplink collision permissible channel is shifted to another band on the frequency axis every predetermined time within a range of the whole bandwidth used by the base station. Accordingly, while the collision permissible channel is received within a range of a given narrow band, wide band effect can be obtained.

In the third method, the mobile terminal randomly determines the transmission band of the uplink collision permissible channel.

In the example shown in FIG. 11B, the mobile terminal A-C transmits the uplink collision permissible channel within a range of a predetermined bandwidth greater than the minimum bandwidth of the system, for example, within a range of the bandwidth of 5 MHz. Also in this case, any one of the methods of (1) transmitting using a band specified from the base station, (2) transmitting within a range of a reception permissible bandwidth determined by the base station beforehand, and (3) determining randomly by the mobile terminal can be used By the way, in the examples shown in FIGS. 11A and 11B, although the bandwidth assigned to the uplink collision permissible type channel is set to be small compared with the bandwidth of the system, the whole bandwidth of the system may be assigned as the band of the uplink collision permissible type channel depending on circumstances. Further, the bandwidth assigned to the collision permissible type channel is determined depending on a size of the system bandwidth, a number of mobile terminals accessing using the uplink, and a size of information amount necessary for the collision permissible type channel. In addition, when the bandwidth assigned for the uplink collision permissible type channel is greater than a band used for actually transmitting the collision permissible type channel, the mobile terminal performing accesses using the collision permissible type channel can perform transmission by temporally changing the frequency of the collision permissible type channel to be transmitted. In this case, improvement of communication quality can be realized due to frequency diversity effect.

Although the present invention is described based on preferred embodiments, the present invention is not limited to these examples, and various modifications and addition can be made for a person skilled in the art.

The present application claims priority based on Japanese patent application No. 2005-317572, filed in the JPO on Oct. 31, 2005 and the entire contents of the Japanese patent application is incorporated herein by reference.

The invention claimed is:

1. A method for setting a transmission and reception bandwidth in a radio communication system defining a plurality of bandwidths, comprising:

accommodating mobile terminals that correspond to one or more of the plurality of bandwidths to the radio communication system regarding transmission bandwidths of a data channel transmitted using an uplink;

providing a processing capability of a transmission bandwidth of a predetermined value greater than a minimum bandwidth in the plurality bandwidths to every mobile terminal accommodated in the radio communication system regarding transmission bandwidths of a pilot channel transmitted using an uplink; and setting the transmission bandwidth of an uplink collision permissible channel transmitted from any mobile terminal in the radio communication system to be a minimum fixed transmission bandwidth of the plurality of bandwidths, wherein the base station in the radio communication system specifies a variable transmission band of an uplink collision permissible channel transmitted by the mobile terminal within a range of a bandwidth used by the base station.

2. The transmission and reception bandwidth setting method as claimed in claim 1, comprising:

setting the transmission bandwidth of the pilot channel to be wider than the transmission bandwidth of the data channel in the uplink.

3. The transmission and reception bandwidth setting method as claimed in claim 2, comprising:

measuring a channel state on a frequency axis using a received pilot channel in a base station in the radio communication system to assign a transmission band of an uplink data channel to the mobile terminal based on the channel state.

4. A method for setting a transmission and reception bandwidth in a radio communication system defining a plurality of bandwidths, comprising:

setting a transmission bandwidth of an uplink collision permissible channel transmitted from any mobile terminal in the radio communication system to be a minimum fixed transmission bandwidth of the plurality of bandwidths, wherein the base station in the radio communication system specifies a variable transmission band of an uplink collision permissible channel transmitted by the mobile terminal within a range of a bandwidth used by the base station.

5. The transmission and reception bandwidth setting method as claimed in claim 4, wherein the base station in the radio communication system predetermines a bandwidth used for receiving an uplink collision permissible channel transmitted from the mobile terminal within a range of a bandwidth used by the base station.

6. The transmission and reception bandwidth setting method as claimed in claim 5, comprising:

changing the bandwidth used for receiving the uplink collision permissible channel within a range of a bandwidth used by the base station as appropriate.

7. The transmission and reception bandwidth setting method as claimed in claim 4, wherein the mobile terminal randomly changes the band for transmitting a collision permissible channel within a range of a bandwidth used by the base station which the mobile terminal tries to access.

\* \* \* \* \*